March 16, 1948. W. E. WILLIAMS 2,437,775
OPTICAL MICROMETER FOR MEASURING THE THICKNESS
OF TRANSPARENT OR TRANSLUCENT BODIES
Filed Feb. 11, 1946 2 Sheets-Sheet 1
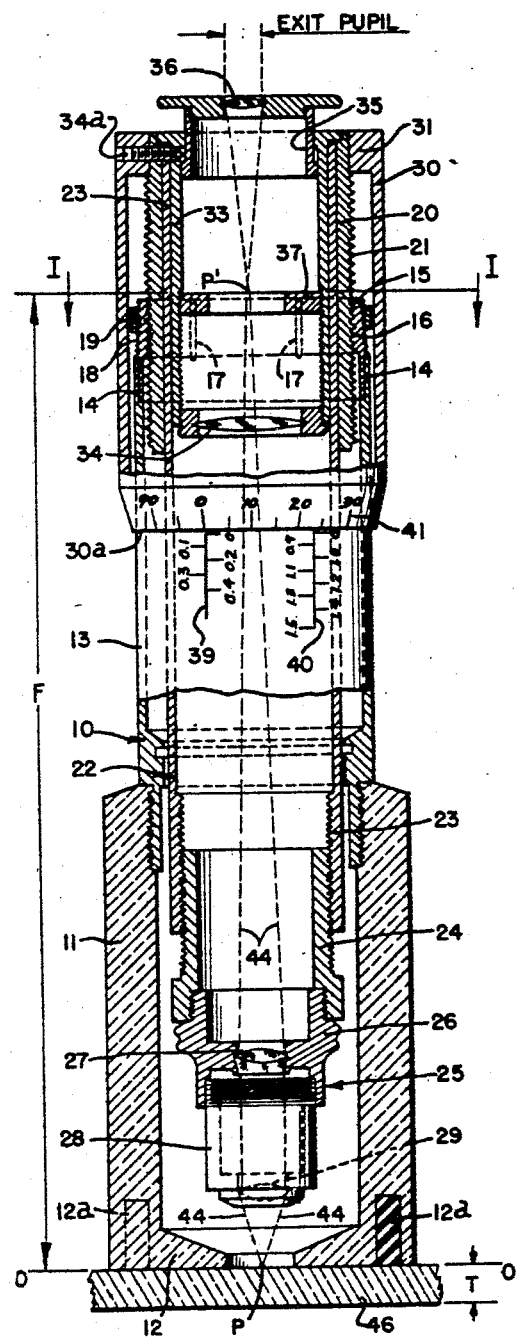
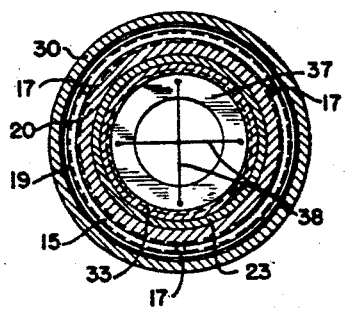
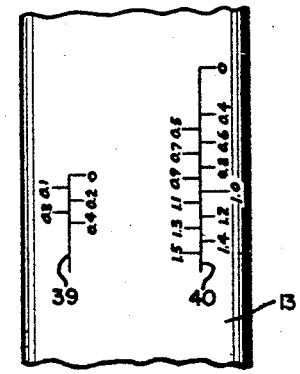
INVENTOR.
WILLIAM EWART WILLIAMS
BY
ATTORNEY March 16, 1948. W. E. WILLIAMS 2,437,775
OPTICAL MICROMETER FOR MEASURING THE THICKNESS
OF TRANSPARENT OR TRANSLUCENT BODIES
Filed Feb. 11, 1946 2 Sheets-Sheet 2
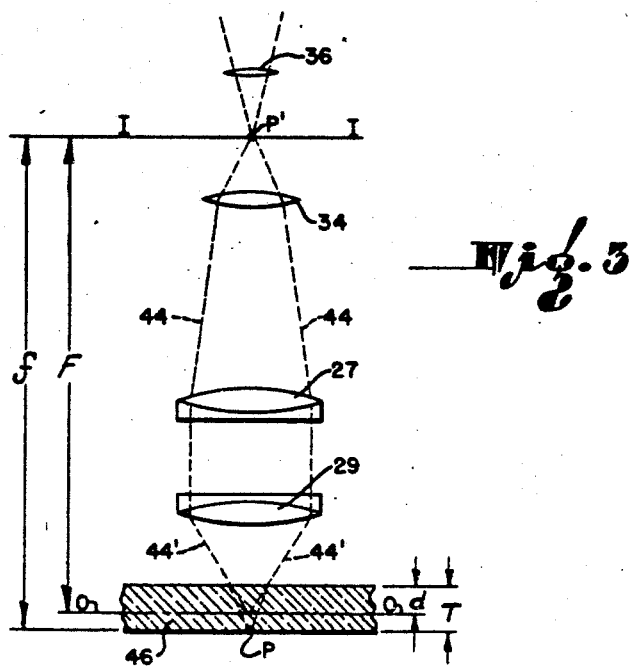
Fig. 3
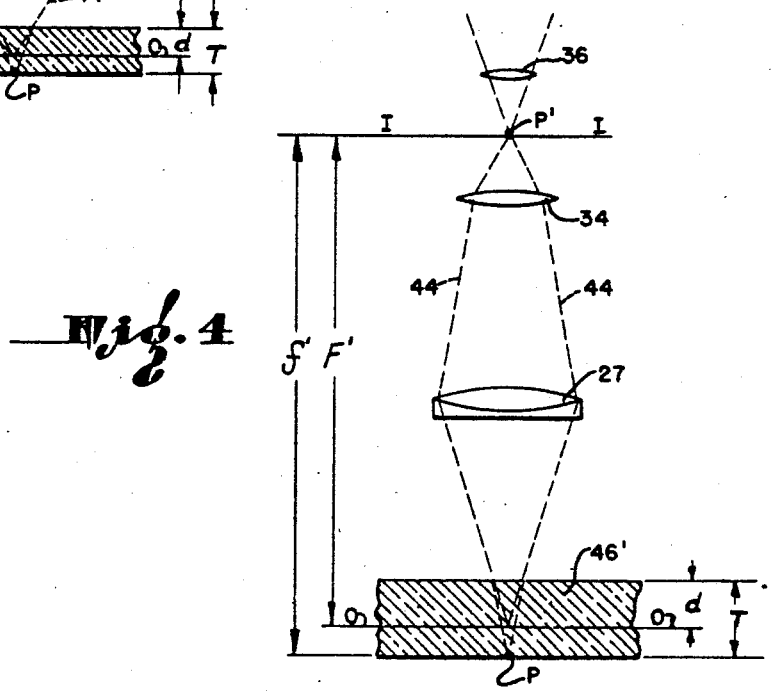
Fig. 4
INVENTOR.
WILLIAM EWART WILLIAMS
BY 
ATTORNEY Patented Mar. 16, 1948

2,437,775

UNITED STATES PATENT OFFICE 2,437,775

OPTICAL MICROMETER FOR MEASURING THE THICKNESS OF TRANSPARENT OR TRANSLUCENT BODIES

William Ewart Williams, Pasadena, Calif.

Application February 11, 1946, Serial No. 646,787

4 Claims. (Cl. 88—14)

My invention relates in general to measuring instruments, and relates in particular to an optical device for measuring in micrometric values the thickness of transparent or translucent bodies such, for example, as glass or plastic. Herein the term "translucent" is used as descriptive of any material capable of transmitting sufficient light for use of the invention.

It is an object of the invention to provide a device whereby the thickness of bodies or sheets of translucent material may be measured without the necessity of one edge of the part to be measured being free, as where ordinary micrometers of mechanical type are employed for thickness measurements.

It is an object of the invention to provide a device for measuring the thickness of or distances within or through translucent substances having lenses so supported that by appropriate lens movement, the object focal plane of the lens system may be moved through measured distances, thereby making it possible to focus the lens system through the translucent object to be measured, from one side thereof, onto an object disposed on the opposite side of the translucent object, the device having indicating means correlated with the lens movement, for indicating the corresponding or proportional movement of the focal plane. The indicating means of the device takes into consideration that the index of refraction of the translucent material is different from the index of refraction of air, and that the movement of the object plane within or through the translucent material will be different from the lens movement.

The preferred form of the invention herein disclosed has a lens system similar to that employed in microscopes, carried by a lens holder which is movable relatively to a support, the lower end of which support is adapted to engage the surface of the sheet or translucent body to be measured. If a transparent sheet is to be measured, a crayon mark is applied to the side thereof away from the instrument, and the thickness measurement is made by focusing the lens system sharply on the mark. The indicating means of the device in this embodiment consists of a scale on which the thickness of the sheet may be directly read.

It is a further object of the invention to provide an optical measuring instrument of the character set forth in the foregoing having a lens system consisting of lenses placed in fixed relation so as to define an object focal plane and an image focal plane, there being an eye piece for observing the image formed in the image focal plane, the lens system being adjustable through measured distances so as to cause the object focal plane or point of the lens system to traverse measured distances. A further object of the invention is to provide an optical measuring instrument of this character having a divisible objective, so that in effect several lens systems of different object-to-image focal distances are obtained, the device having different measurement indicating scales corresponding to the different lens systems.

A further object of the invention is to provide a measuring instrument of the character described, wherein the image focal plane of the lens system has therein a reference element on which the eye piece lens may be focused by the user.

A further object of the invention is to provide an optical measuring instrument of this character, wherein the reference element in the image focal plane is utilized in checking or confirming the visual focusing of the lens system on the object.

Further objects and advantages of the invention will be brought out in the following part of the specification.

Referring to the drawings which are for illustrative purposes only,

Fig. 1 is a partly sectioned view, to enlarged scale, of a preferred embodiment of my invention.

Fig. 2 is a cross section taken on the plane indicated by the line I—I of Fig. 1.

Fig. 3 is a diagrammatic view illustrating the utility of the invention with the complete objective.

Fig. 4 is a diagrammatic view for explaining the use of the invention with a divisible part of the objective.

Fig. 5 is a fragmentary view of a section of the device having the longitudinal scales thereon.

Referring to Fig. 1, the measuring instrument comprises a support 10 consisting of a nose piece 11 of transparent or translucent material, such as one of the plastics, for example. This nose piece 11 is of cylindric form and has a front end face 12 lying in a plane perpendicular to its axis. Soft rubber plugs 12a are supported in the piece 11 in such manner that they project yieldably a few thousandths of an inch from the face 12 to engage the surface of the piece to be measured and resist slippage. A tube 13, of light metal such as aluminum, is threaded into the upper portion of the nose piece 11. The upper end of the tube 13 has a counterbore 14 which receives a sleeve 15 having internal threads 16. The upper portion of the sleeve 15 has slots 17, and is equipped with a tapered external thread 18 to receive an internally threaded ring 19, to constrict the upper portion of the sleeve 15 into proper working relation to the part 20 having external threads 21 engaged by the threads 16 of the sleeve 15.

The part 20 comprises a sleeve forming a part of a lens holder 22 which is axially movable relatively to the support 10. The lens holder 22 includes a tube 23 internally threaded at its lower end to receive an adjustable objective supporting sleeve 24 which, in its lower end, carries a divisible objective 25 consisting of an upper part 26 having therein an objective lens element 27, and a lower detachable part 28 having therein an objective lens element 29. The externally threaded member 20 is fixed on the upper end of the tube 23 and supports a shell 30 which extends down over the tube or barrel 13. On the upper part of the shell 30 there is an inwardly projecting flange 31 which is secured to the upper portion of the externally threaded member 20, thereby incorporating the shell 30 in the lens holder 22.

A relatively short cylinder 33 is insertable into the upper end of the tube 23. In the lower end of the cylinder 33 there is a lens 34 and in the upper end of the cylinder 33 there is a vertically adjustable sleeve 35 forming a holder for an eye piece lens element 36 which cooperates with the lens 34 in forming an ocular for the lens system of the measuring instrument. A set screw 34a is provided whereby the sleeve 35 may be locked after adjustment of the lens element 36 to suit the eye of the user. Within the cylinder 33 there is a ring or shoulder 37, the upper face of which is disposed substantially in the image focal plane I—I of the lens system of the device. This ring 37 supports a reference element consisting of cross hairs 38 lying in the image focal plane I—I.

The barrel 13 is provided with scales 39 and 40. The scale 39 is relatively short and is used with the complete objective 25. The scale 40 is longer and is used when the lower part 28 of the objective lens 25 is removed, thereby limiting the objective of the lens system to the single lens element 27. The lower lip 30a of the shell 30 is chamfered and is provided with graduations 41 in the manner generally employed in micrometers. When the lens support 22 is in zero position, that is to say—when the zero numeral of the graduations 41 corresponds to zero of the scale 39—the lenses 29, 27 and 34 are disposed so that an object in the object focal plane O—O will be imaged in the image focal plane I—I. The distance between the planes O—O and I—I is referred to as the focal plane distance characteristic of the lens system disclosed in Figs. 1 and 3. For illustrative purposes only, I have shown light rays 44 from a point P in the plane O—O, which coincides with the lower face 12 of the nose piece 11 to a point P' in the image focal plane I—I, these light rays passing through refractive mediums consisting only of glass and air. It will be understood that if the shell 30 is rotated so as to move the lens holder 22 downward, the point P will be moved downward from the position in which it is shown in Fig. 1. As long as the point P is in air, the focal plane distance F will remain constant. That is to say, the axial movement of the point P will be the same as the axial movement of the plane I—I. However, a different condition exists when another or different refractive medium is brought into the light path between the points P and P'.

For example, let it be supposed that a piece of translucent or transparent material 46 is placed against the lower face 12 of the nose piece 11. If the upper surface of the piece 46 is planar, the point P will coincide with the upper surface of the piece 46 when the lens holder 22 is in zero position as shown in Fig. 1. Should the lens holder 22 now be screwed downward so as to lower the lens system, the point P will pass into the piece 46, but the downward translation of the point P will be greater than the downward translation of the plane I—I due to refraction of light by the material of the piece 46.

In Fig. 3 I have diagrammatically shown the lens system lowered with relation to the piece 46 so as to bring the object focal point P into a position coinciding with the lower face of the piece 46. Owing to the refraction of the piece 46, the incident light rays 44' will be bent as they leave the upper surface of the piece 46, thereby increasing the focal plane distance F of the lens system in air to a focal plane distance f, where the lower part of the light path is within the refractive material of the piece 46. Accordingly, in order to move the focal point P from the upper surface of the piece 46 to the lower surface thereof, it is not necessary to move the lens system downward a distance equal to the thickness T of the piece 46, but it is only necessary to move the lens system downward a distance d which is equal to the distance T multiplied by the reciprocal of the index of refraction of the material from which the piece 46 is formed. From the foregoing it will be perceived that the movement of the lens system required to cause the focal point P to traverse the thickness T of the piece 46 is inversely proportionate to the ratio of the index of refraction of the material of the piece 46 to the thickness T of the piece 46. Otherwise stated, the movement d of the lens system required to bring the focal point P to the lower surface of the piece 46 is proportional to the thickness T as the inverse of the index of refraction of the material from which the piece 46 is formed.

Therefore, the scale 39 is linearly reduced from the true distances which are to be indicated thereby in inverse proportion to the index of refraction of the material to be measured. The instrument is well suited for the measurement of acrylic plastics, the index of refraction of which is 1.518, app. Therefore, the distance which the lens holder 22 must be axially moved in order to move the point P a given distance within an acrylic plastic is $$\frac{1.00}{1.518} = .6653 T$$

where T is the thickness of the acrylic plastic measured.

In the present form of the invention, the chamfer 41 of the shell 30 is graduated into one hundred units, each to represent one $1/1000$ of an inch thickness of the piece being measured. In keeping therewith, the pitch of the screw thread 21 is determined by the value 10N where N is the effective refractive index of the plastic for white light from a Mazda 15 watt daylight fluorescent lamp. For acrylic resins, the screw thread has $10 \times 1.518$ or 15.18 turns per inch.

The instrument may be focused on the object, ordinarily a crayon mark applied to the back of the sheet or piece 46, in either of two ways. The first method is to merely adjust the lens holder until the image of the crayon mark has maximum clarity and sharpness. The other method is to adjust the device until there is no parallax between the image and the cross wires 38 constituting the reference element when the eye is moved from side to side. The second method is the more accurate of the two and may be used as a quick check on the first method. A simple procedure is to place the instrument on the plastic member 46 with the crayon mark on the underneath side and then turn the shell 30 until the mark is clear and sharp, and appears to lie in the same plane I—I as the cross wires 38. The eye is then shifted laterally to observe whether the image of the mark will move relatively to the image of the cross hairs 38. If there is no parallax, it is evident that a perfect setting has been made. Movement of the image of the mark relative to the cross wires, respectively with or contrary to the movement of the eye, indicates that the lens system is too far away from or too close to the object or mark.

As indicated in schematic Fig. 4, removal of the lower lens element 29 increases the focal plane distance F of Fig. 3 to the focal plane distance F'' shown in Fig. 4, but the principle of operation of the device remains the same—that is to say, when light from the object at the focal point P, Fig. 4, must pass through refractive material 46' having an index of refraction different from air, the focal plane distance of the lens system increases to f' which is variable and increases as the thickness T of the piece 46' increases. As hereinbefore indicated, the lens system shown in Fig. 3 is employed for measurement of the smaller distances—for example, up to 0.4 inch—and the reduced lens system shown in Fig. 4 is employed for measurement of distances between 0.4N and 1.5N.

I claim as my invention:

1. An optical micrometer for measuring the thickness of transparent or translucent bodies, which comprises a support having a reference surface adapted to engage the front surface of the body to be measured, a lens system adapted to be focused on the surfaces of said body, a member carrying said lens system and movable relative to said support in so focusing said lens system, screw means connecting said support and said member for so moving said member, the pitch of said screw means in turns per unit of linear movement between said member and support being ten times the index of refraction of the material to be measured, a rotating decimal graduated micrometer scale, carried by said screw means, and a scale carried by said support, cooperating therewith and graduated in units of rotation of said screw means, whereby the units of said scale indicate the linear movement of the object plane of said lens system rather than the linear movement between said member and support.

2. An optical micrometer for measuring the thickness of transparent or translucent bodies, which comprises a support having a reference surface adapted to engage the front surface of the body to be measured, a lens system adapted to be focused on the surfaces of said body, a member carrying said lens system and movable relative to said support in so focusing said lens system, screw means connecting said support and said member for so moving said member, the pitch of said screw means in turns per inch being ten times the index of refraction of the material to be measured, a rotating micrometer scale attached to said member graduated in decimal units, and a scale cooperating therewith carried by said support graduated in units of rotation of said member whereby said scales indicate the movement of the object plane of the lens system, rather than the relative movement between said member and support.

3. An optical micrometer for measuring the thickness of transparent or translucent bodies, which comprises a support having a reference surface adapted to engage the front surface of the body to be measured, a lens system adapted to be focused on the surfaces of said body, a member carrying said lens system and movable relative to said support in so focusing said lens system, screw means connecting said support and said member for so moving said member, the pitch of said screw means in turns per unit of relative movement between said member and support being ten times the index of refraction of the material to be measured, said screw means carrying a rotating decimal graduated micrometer scale and said support carrying a graduated scale cooperating therewith, having markings in units of rotation of said screw means, said markings having zero indicia when said member is positioned so that said lens system is focused on the plane defined by said reference surface.

4. An optical micrometer for measuring the thickness of transparent or translucent bodies, which comprises a support having a reference surface adapted to engage the front surface of the body to be measured, a lens system adapted to be focused on the surfaces of said body, a member carrying said lens system and movable relative to said support in so focusing said lens system, screw means connecting said support and said member for so moving said member, the pitch of said screw means in turns per inch of relative movement between said member and support being ten times the index of refraction of the material to be measured, the screw means carrying a rotating decimal graduated micrometer scale, a scale carried by the support cooperating with said micrometer scale and graduated in units of rotation of said micrometer scale, whereby the units of graduation of said latter scale indicate in tenths of an inch the movement of the object plane of the lens system and the micrometer graduations indicate the decimal fractions thereof.

WILLIAM EWART WILLIAMS.

REFERENCES CITED

The following references are of record in the file of this patent:

UNITED STATES PATENTS

| Number | Name | Date |
|---|---|---|
| 1,503,543 | Lytle | Aug. 5, 1924 |

OTHER REFERENCES

"Manual of Petrographic Methods," by Johannsen; second edition; pub. 1918; page 293 cited.